2,716,063

HOG FOOD

Paul B. Shearer, Drexel Hill, Pa.

No Drawing. Application June 11, 1952,
Serial No. 292,983

9 Claims. (Cl. 99—2)

This invention relates to food for animals, and more particularly is for food for hogs made from the whey byproduct from the manufacture of cheese.

In the manufacture of cheese, most of the solids are extracted from the whole milk, resulting in the production of large amounts of whey, which in smaller plants especially in and about cities, is an obnoxious waste, the disposal of which presents a manufacturing problem and expense. Very large factories can economically install expensive evaporators to reduce it to solid form for use in poultry or animal feed, or other commercial purposes. While the whey has frequently been discharged into sewers and streams, this is objectionable from the standpoint of water pollution, and restrictions have been imposed in many States upon such method of disposal.

While the whey is a waste product, it nevertheless contains substantial amounts of the original lacteal food components of the whole milk. It has been found that hogs will eat the liquid whey with avidity and will thrive upon it if it is a principal factor in their diet, or if used wth proper fodder or grain. However, where attempts have been made to use it with hogs raised in or about cities where the diet is principally garbage, the hogs having their diet supplemented with whey develop the scours and may die. For this reason, piggeries in and about cities afford no outlet for whey produced locally and for which disposal is a problem.

Garbage fed to hogs has usually started to decay and is definitely acid in character. Whey, resulting from the manufacture of cheese, contains free lactic acid. I have determined that the acidity of the garbage aggravated by the lactic acid in the whey is responsible for the unwholesome effect of whey in feeding pigs that are also fed garbage. In accordance with the present invention, mineral supplements are added to the whey in amounts sufficient to substantially reduce but not necessarily neutralize the free lactic acid and produce lacetates or acid lactates which are beneficial to the growth of the animal. In the manufacture of cheese, the proteins of the whole milk are largely extracted so that the whey, even when so neutralized, is by no means comparable to the original milk. I have found that this deficiency can be largely offset by introducing into the neutralized whey another waste product, i. e., brewer's yeast, a byproduct resulting from the operation of breweries, after first inactivating the yeast, so as to destroy its enzymic or fermentative properties. This yeast is relatively high in edible protein, so that it provides the whey with a protein complement at very little cost. The whey thus treated makes a very satisfactory and beneficial, as well as economical, hog food having nutritive properties comparable to, or superior to, raw skim milk. Feeding tests on hogs in garbage operated piggeries have established that whey so processed considerably accelerates the growth of hogs, and that the health of the animals is improved.

In accordance with my invention, a calcium compound which will react with lactic acid is introduced into the whey and mixed therewith. Calcium carbonate may be economically used for this purpose, and from three to five ounces of calcium carbonate are used to one hundred pounds of whey. The calcium carbonate reacts with lactic acid to produce normal calcium lactate, or if there is insufficient calcium carbonate present, so-called calcium acid lactate may be produced. Calcium lactate in and of itself is a beneficial supplement to the animal diet, and in conjunction with the other ingredients of the whey, forms a nourishing food for hogs. In place of calcium carbonate, calcium oxide or hydrated lime may be introduced into the whey, either directly, or after having first been mixed with water.

Other calcium compounds which may be used are: calcium peroxide, calcium hydride, calcium saccharate or saccharated lime as it is sometimes termed, calcium gluconate, and calcium butyrate, all of which compounds are available commercially. Calcium gluconate is especially valuable because its reaction with lactic acid results in the formation of calcium lactate and gluconic acid, the latter being a substance necessary to the maintenance of life, and therefore an important addition to the animal food. While the cost of the calcium peroxide, or of calcium saccharate, or calcium gluconate, or calcium butyrate is substantially more than the cost of lime or calcium carbonate, the amounts used are relatively small, being of an order to provide the same available calcium as three to five ounces of calcium carbonate, i. e., a few ounces per hundred pounds of whey. The cost factor of these more expensive compounds is by no means a deterrent to their use. Also, combinations of these materials may be used, as for example calcium carbonate may be supplemented with calcium gluconate, or mixtures of the various other calcium compounds mentioned may be used. Also, while I have mentioned specific compounds, other edible or ingestible calcium compounds which will react to neutralize lactic acid may be employed. These will be edible calcium salts whose acid radical has a hydrogen-ion concentration less than that of lactic acid. Calcium sulphate or calcium chloride therefore would not be used as a principal calcium compound in treating the whey.

While the lactic acid might be neutralized with other compounds, calcium compounds are used in the present invention because of the recognized value of calcium as a growth factor in animal development.

The whey is treated in the state in which it is obtained from the cheese manufacturing establishment, i. e., it is unnecessary to concentrate it or to otherwise process it before introducing the calcium compound used as a neutralizing agent, and as above indicated, the exact proportions are not critical, it being desirable that there be enough available calcium to substantially reduce the acidity of the whey, but it is not necessary that all of the lactic acid be neutralized, nor would an excess of the calcium compound over that required for neutralization be harmful.

While whey thus treated is of itself a valuable food supplement for the feeding of hogs, especially those fed with garbage, its value, as indicated above, can be substantially enhanced by introducing into the whey after neutralization of the acid, inactivated brewer's yeast which restores to the whey a protein complement or balance, thus making it more nearly a substitute for skim milk.

As hereinabove stated, brewer's yeast is a waste byproduct of the brewing industry. Its introduction into whey would stimulate fermentation. Therefore the yeast as it is obtained from the brewery in liquid form is heated to temperature which destroys its enzymic and proteoletic properties and inactivates the yeast, but insufficiently to destroy the material. A temperature of around 100° C. is satisfactory for this purpose. The amount of yeast used may range between ½ to 5% of yeast solids for a given amount of whey. Present indications are that the optimum is about 2% by weight, or enough liquid yeast to provide two pounds of yeast solids to each hundred pounds of whey. As above indicated, the amount of yeast is not too critical, except that good results are obtained using about 2% of yeast solids, and because of the very bitter taste, a substantially higher concentration is apt to render the material unpalatable to the animal, and otherwise too heavy a concentration of the yeast is not considered advisable from a nutritive standpoint.

Since brewer's yeast solids have a protein content of above 50%, the yeast serves to restore to the whey a protein content to replace, at least in part, the protein extracted from the whole milk in the making of cheese. While the protein in the brewer's yeast is of a chemical structure specifically different from that of the milk, it nevertheless is compatible with the whey, and feeding tests indicate that the processed whey may constitute an acceptable substitute nutritionally for skim milk in the feeding of hogs or may even be superior to skim milk. The whey thus treated becomes a wholesome nutrient containing mineral salts, vitamins, protein and lacteal components and other nutritive properties. At the same time this valuable food, being obtained largely from waste products and relatively inexpensive mineral supplements, is cheap and economical. It presents the dairy with a saleable product which is currently a waste disposal problem, and provides an outlet for great quantities of waste brewer's yeast. Also as indicated above, feeding tests show that where hogs will not thrive and will become unhealthy and even die where untreated whey is fed in substantial quantities, along with garbage as a principal diet, the present material will actually accelerate their growth and the digestive processes of the animals appear to be improved. The whey thus processed is of particular value as a supplement for the diet of garbage fed hogs but it may be desirably used for hogs raised on other foods.

Having thus fully described my invention and the method of perfecting the same, I claim:

1. A composition of matter for the feeding of hogs comprising liquid whey resulting from the manufacture of cheese supplemented with an ingestible reactive calcium compound in an amount approximately sufficient to substantially reduce the free lactic acid in the whey.

2. A composition of matter for the feeding of hogs as defined in claim 1 in which the calcium compound provides the equivalent available calcium of about three ounces of calcium carbonate per hundred pounds of the liquid whey.

3. A composition of matter for the feeding of hogs as defined in claim 1 in which the calcium compound is calcium carbonate in the range between about three to five ounces of calcium carbonate to one hundred pounds of liquid whey.

4. A composition of matter for the feeding of hogs as defined in claim 2 in which the calcium compound is calcium gluconate.

5. A composition of matter for the feeding of hogs as defined in claim 2 in which the calcium compound is hydrated lime.

6. A composition of matter for feeding of hogs comprising liquid whey resulting from the manufacture of cheese supplemented with an ingestible reactive calcium compound in an amount sufficient to substantially reduce the free lactic acid in the whey, and further supplemented inactivated brewer's yeast to the amount of ½ to 5% by weight of yeast solids.

7. A composition of matter for the feeding of hogs comprising a liquid substitute for skim milk comprised of liquid whey resulting from the manufacture of cheese, wherein the lactic acid of the whey has been substantially reduced with an ingestible calcium compound, and containing between about ½ to 5% by weight of inactivated brewer's yeast solids.

8. A milk substitute for the feeding of hogs comprised of whey from the manufacture of cheese having a substantial amount of its inherent lactic acid radical combined with calcium and supplemented with an admixture of between about ½ and 5% of inactivated brewer's yeast solids.

9. The method of processing whey resulting from the manufacture of cheese to convert it to a more beneficial hog food which comprisees introducing into the whey a sufficient amount of a reactive calcium compound to convert a substantial amount of its free lactic acid to calcium lactate and fortifying it with inactivated brewer's yeast in a range of from ½ to 5% by weight of yeast solids of yeast to the treated whey.

References Cited in the file of this patent

UNITED STATES PATENTS

| | | |
|---|---|---|
| 987,849 | Block | Mar. 28, 1911 |
| 2,608,483 | Hayes | Aug. 26, 1952 |